United States Patent [19]

Whittles

[11] Patent Number: 5,701,842
[45] Date of Patent: Dec. 30, 1997

[54] BIRD FEEDER

[75] Inventor: Franklyn Brian Whittles, Shrewsbury, United Kingdom

[73] Assignee: C J Wildbird Foods Ltd., Shropshire, United Kingdom

[21] Appl. No.: 702,584

[22] PCT Filed: Jan. 27, 1995

[86] PCT No.: PCT/GB95/00165

§ 371 Date: Aug. 30, 1996

§ 102(e) Date: Aug. 30, 1996

[87] PCT Pub. No.: WO95/26133

PCT Pub. Date: Oct. 5, 1995

[30] Foreign Application Priority Data

Mar. 26, 1994 [GB] United Kingdom ............... 9406055

[51] Int. Cl.[6] .................................................. A01K 39/012
[52] U.S. Cl. ................................... 119/52.2; 119/57.8
[58] Field of Search ........................... 119/52.2, 52.3, 119/52.1, 53, 57.8, 57.9, 53.5, 54

[56] References Cited

U.S. PATENT DOCUMENTS

| 1,831,828 | 11/1931 | Swendsen | 119/52.2 |
| 2,786,446 | 3/1957 | Newman | 119/52.2 |
| 2,804,844 | 9/1957 | Gigliotti | 119/52.2 X |
| 4,995,343 | 2/1991 | Cole et al. | 119/53 |
| 5,291,855 | 3/1994 | Laverty | 119/52.3 |
| 5,558,040 | 9/1996 | Colewell et al. | 119/52.2 |

*Primary Examiner*—Gene Mancene
*Assistant Examiner*—Yvonne R. Abbott
*Attorney, Agent, or Firm*—Learman & McCulloch

[57] ABSTRACT

A bird feeder comprising a tubular container (10) for the food having a number of access ports (12, 14) so that birds may reach the food for example peanuts or grain, which settles under gravity onto a base (22). In order to make even the last few particles available to the birds the base (22) has sloping faces (24, 26) which shed the food to the outer periphery of the base (22) and into concave recesses (28) which are aligned with the access ports (12, 14).

7 Claims, 1 Drawing Sheet

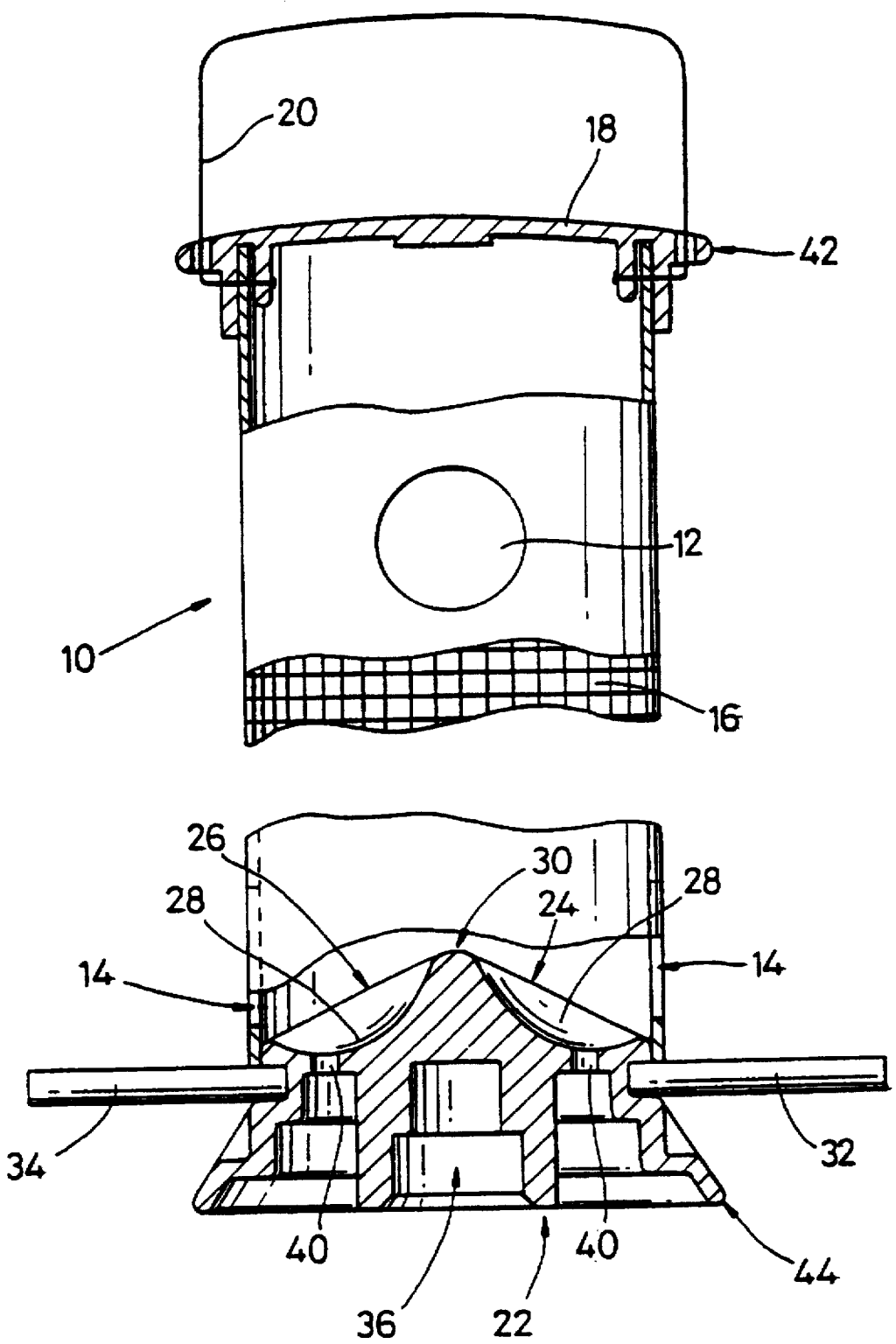

BIRD FEEDER

This invention relates to bird feeders especially for wild birds, of the kind comprising a container for particulate food e.g. seed grains, and a number of access ports which birds may peck through in order to reach the food. The container may be a tube of mesh, which for these purposes is equivalent to a whole series of such ports. Alternatively the container may be a tube of plastics material with individual ports spaced around and along the tube. However, the tubular form is not of itself essential and non-prismatic shapes may be employed.

Food descends in the container by gravity. If the container is of more than a certain minimum diameter, then the central area of the container may be inaccessible to the birds and food remaining on that area when the container is otherwise empty may go bad. To avoid this, it is known to make the base of the container generally conical or with a central upwardly extending plug, but certain difficulties remain.

U.S. Pat. No. 4,977,859 shows a feeder in which the container has a downwardly outwardly slanted lower wall and feed openings for access to food piled on said wall open through a circular band which surrounds that wall.

According to the invention, a base for the container of a bird feeder of the kind comprising a number of access ports is made with an upwardly projecting plug located within the container, said plug having a face or faces which are inclined so as to shed food particles towards the outer perimeter of the plug, and characterised in that a number of concave recesses are provided in the face or faces and are arranged opposite ones of said ports. Hence the last particles of food in the container as it empties will gravitate into the said recesses and be available to the birds.

Preferably the base is symmetrical about a diameter, and has a pair of shedding faces each provided with one of said concavities.

Preferably the concavities have drainage passages opening through to the exterior of the base, and which are necessarily of smaller size than the seed or of the food particles intended to be charged into the container.

One embodiment of the invention is now more particularly described with reference to the accompanying sole drawing which is a part-sectional elevation Referring to the drawing, the reference 10 indicates a container body which may be a tube of preferably clear plastic, provided with access ports such as 12, 14, or it may be made of mesh as indicated by the reference 16. The top 18 is readily removable for recharging and is fixed to the top of the container by means of a suspension loop 20.

The base which is the subject of the invention is generally indicated by the reference 22, and comprises a plug extending into the tube and formed with a pair of generally planar obtusely related shedding surfaces 24 26 each of which is scooped out concavely at 28 and these concavities are angularly aligned, relative to the axis of the tube, with the ports 14 if so provided. The ports may include shields preventing loss of food particles by falling out of the ports (not shown) in conventional manner.

The ridge 30 lying between the faces 24 26 may be arcuate along its length so the centre point along its length is lower than its ends. The feeder is provided with perches such as the short rods 32 34 which may be inserted in holes in the base and may also (but not shown) be used to secure the base to the tube.

The base has a socket 36 on its lower face for pole mounting as an alternative to loop suspension.

Preferably the base and top are made as diecastings in aluminium or like alloy, so as to be squirrel resistant, but suitable plastics mouldings are also possible for a less expensive if less durable alternative. Drainage ports 40 open through the concavities, and both base 22 and top 18 may be provided with radially projecting rims 42 44.

I claim:

1. A container for dispensing food for birds comprises a hollow tube with at least one port therein for access to the food, and a base to the container, said base having a plug directed upwardly within the container, characterised in that said plug has at least one shedding face which is inclined so that a body of food particles in the container settling under gravity is shed towards the outside of the plug, and also characterised in that said at least one shedding face has a concave recess arranged opposite said at least one port.

2. A container as claimed in claim 1 wherein said base is symmetrical about a diameter and provides a pair of shedding faces each provided with one of said concave recesses.

3. A container as claimed in claim 2 wherein said shedding faces meet at an apex (30) which is rounded in cross-section and concave along its length.

4. A container as claimed in any one of claims 1–3 wherein at least one drainage passage opens through the base from the concave recess.

5. A container as claimed in claim 4 wherein said drainage passage is of such size as to preclude passage of food particles therethrough.

6. A container as claimed in any one of claims 1–3 wherein said container comprises a tube of mesh.

7. A container as claimed in any one of claims 1–3 wherein said container comprises a transparent plastic tube.

* * * * *